US010564011B2

(12) United States Patent
Ting et al.

(10) Patent No.: US 10,564,011 B2
(45) Date of Patent: Feb. 18, 2020

(54) LINEAR PIEZOELECTRIC MOTOR AND SLIDER DRIVE SYSTEM THEREOF

(71) Applicant: Chung-Yuan Christian University, Tao Yuan County (TW)

(72) Inventors: Yung Ting, Tao Yuan County (TW); Sheuan-Perng Lin, Tao Yuan County (TW); Chien-Hsiang Wu, Tao Yuan County (TW)

(73) Assignee: CHUNG-YUAN CHRISTIAN UNIVERSITY, Chung Li, Tao Yuan County (TW)

( * ) Notice: Subject to any disclaimer, the term of this patent is extended or adjusted under 35 U.S.C. 154(b) by 254 days.

(21) Appl. No.: 15/878,636

(22) Filed: Jan. 24, 2018

(65) Prior Publication Data

US 2018/0372516 A1 Dec. 27, 2018

(30) Foreign Application Priority Data

Jun. 22, 2017 (TW) ............................ 106120914 A

(51) Int. Cl.
*H02N 2/08* (2006.01)
*G01D 5/347* (2006.01)
*H02N 2/00* (2006.01)

(52) U.S. Cl.
CPC ......... *G01D 5/34753* (2013.01); *H02N 2/007* (2013.01); *H02N 2/08* (2013.01)

(58) Field of Classification Search
CPC . G01D 5/34753; H01L 41/107; H01L 41/042; H02N 2/16; H02N 2/007; H02N 2/08
USPC .... 235/475, 481; 310/316.02, 317, 318, 320
See application file for complete search history.

(56) References Cited

U.S. PATENT DOCUMENTS 5,632,074 A * 5/1997 Kanazawa ............ H02N 2/163 29/25.35
5,726,519 A * 3/1998 Gonnard ............... H02N 2/163 310/323.04
6,984,920 B2 * 1/2006 Yoon ................... H02N 2/0025 310/323.02
7,759,841 B2 * 7/2010 Schneider ............... H02N 2/04 310/323.02

(Continued)

FOREIGN PATENT DOCUMENTS

TW 201304386 A 1/2013
TW 201720043 A 6/2017

*Primary Examiner* — Paultep Savusdiphol
(74) *Attorney, Agent, or Firm* — Muncy, Geissler, Olds & Lowe, P.C.

(57) ABSTRACT

A linear piezoelectric motor and a slider drive system thereof are disclosed. The linear piezoelectric motor includes a piezoelectric ceramic element and a base structure. The piezoelectric ceramic element includes a first region, a second region and an interval region located between the first and the second region, wherein the first and the second region may be formed by a first and a second power signal supplied by a power supply to form a first and a second standing wave, respectively. The interval region is a quarter wavelengths. The first and the second standing wave have a phase difference so as to form a traveling wave. The base structure disposes the piezoelectric ceramic element and has a pectinate structure to increase the amplitude of the first and the second standing wave, thereby enabling the piezoelectric motor to be driven.

16 Claims, 7 Drawing Sheets

(56) References Cited

U.S. PATENT DOCUMENTS

| | | | | |
|---|---|---|---|---|
| 8,097,998 | B2 * | 1/2012 | Trietz | H02N 2/04 310/323.02 |
| 2002/0180310 | A1 * | 12/2002 | Ngol | H02N 2/021 310/328 |
| 2003/0178915 | A1 * | 9/2003 | Yoon | H02N 2/0025 310/323.01 |
| 2008/0211348 | A1 * | 9/2008 | Wischnewskij | H02N 2/0055 310/323.02 |
| 2008/0309193 | A1 * | 12/2008 | Ellesgaard | H02N 2/163 310/316.02 |
| 2009/0243435 | A1 * | 10/2009 | Schneider | H02N 2/04 310/323.16 |
| 2010/0102645 | A1 * | 4/2010 | Trietz | H02N 2/04 310/12.31 |

* cited by examiner

LINEAR PIEZOELECTRIC MOTOR AND SLIDER DRIVE SYSTEM THEREOF

BACKGROUND OF THE INVENTION

1. Field of the Invention

The present invention relates to a linear piezoelectric motor and a slider drive system thereof, particularly to a linear piezoelectric motor capable of achieving stable movement and a slider drive system thereof.

2. Description of the Related Art

With the progress of the times, the linear motor slider system and equipment using a traditional servo (DC or AC) motor has been quite common. It mostly adopts a traditional electromagnetic rotary motor to drive a drive screw to do linear slider drive. However, there may be screw drive spacing errors due to motor inertia, such that the requirement of high precision positioning control could not be achieved. Accordingly, a piezoelectric ceramic motor made of piezoelectric materials has been developed. The piezoelectric motor made of the piezoelectric ceramic material with features such as the micro-actuated displacement, instant start-stop, and high-frequency ultrasonic drive response can replace the electromagnetic motor so as to improve the drive positioning accuracy. The application of piezoelectric ceramics can be seen everywhere in daily life, such as digital cameras or a camera module in a mobile phone, in which the devices such as a zoom unit and an image stabilization unit use the piezoelectric ceramic material as actuators. However, in the prior art, the piezoelectric motor for linear drive is mainly a rotary type traveling wave piezoelectric motor, or various types of standing wave or stepping type piezoelectric motors. The sanding wave stepping type piezoelectric motor can directly drive the slider drive, but its stability is poor because of its discontinuous periodic contact friction drive. With the continuous traveling wave drive feature, the traveling wave piezoelectric motor can keep the contact with the drive surface continuously at each peak point. This can maintain high drivability and stability. Nevertheless, the current traveling wave motor adopts a ring structure, which can only do the rotation of indirect screw drive or local contact tangential component drive to achieve the linear slider drive.

Therefore, it is necessary to provide a new linear piezoelectric motor and a slider drive system thereof to solve the problems in the prior art.

SUMMARY OF THE INVENTION

It is a major objective of the present invention to provide a linear piezoelectric motor capable of achieving the effect of stable movement.

It is another objective of the present invention to provide a slider drive system having the aforementioned linear piezoelectric motor.

To achieve the above objectives, the linear piezoelectric motor of the present invention is used in the slider drive system, and is driven by a first and a second power signal supplied by a power supply module, respectively. The linear piezoelectric motor includes a piezoelectric ceramic element and a base structure. The piezoelectric ceramic element includes a first region, a second region, and an interval region located between the first region and the second region, wherein the first and the second region may be formed by the first and the second power signal to form a first and a second standing wave, respectively. Specifically, the interval region is a quarter wavelengths. The first and the second standing wave have a phase difference so as to form a traveling wave. The base structure disposes the piezoelectric ceramic element and has a pectinate structure to increase the amplitude of the first and the second standing wave, so as to enable the piezoelectric motor to be driven.

The slider drive system in the present invention includes a base, a block, a power supply module, ceramic strip, and a linear piezoelectric motor. The base has a track. The block is disposed on the track and slidable on the track. The power supply module is used to supply the first power signal and the second power signal, respectively. The linear piezoelectric motor is in contact with the ceramic strip, and is electrically connected to the power supply module. The linear piezoelectric motor includes a piezoelectric ceramic element and a base structure. The piezoelectric ceramic element includes a first region, a second region, and an interval region located between the first region and the second region, wherein the first and the second region may be formed by the first and the second power signal to form a first and a second standing wave, respectively. The interval region is a quarter wavelengths. The first and the second standing wave have a phase difference so as to form a traveling wave. The base structure disposes the piezoelectric ceramic element and has a pectinate structure to increase the amplitude of the first and the second standing wave, so as to enable the piezoelectric motor to be driven.

DETAILED DESCRIPTION OF THE PREFERRED EMBODIMENT

Hereafter, the technical content of the present invention will be better understood with reference to preferred embodiments.

Figure 1A:
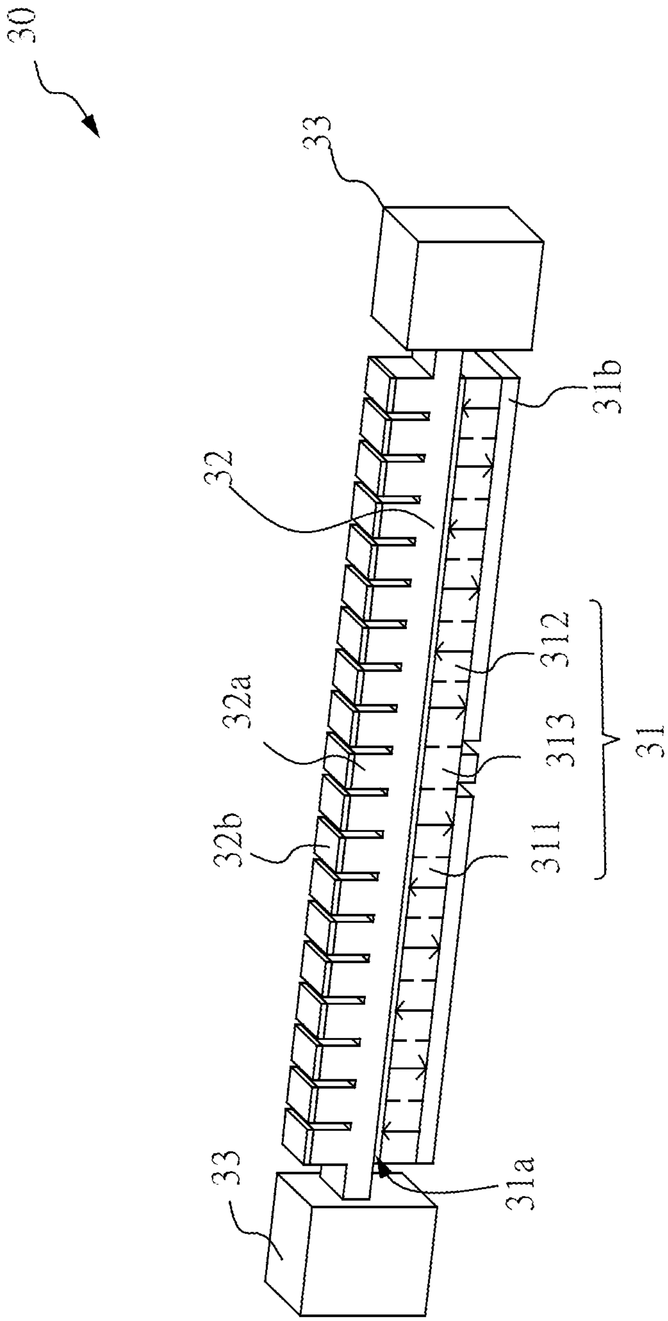
FIG. 1A is a schematic diagram showing the appearance of a linear piezoelectric motor in the present invention.
Figure 1B:
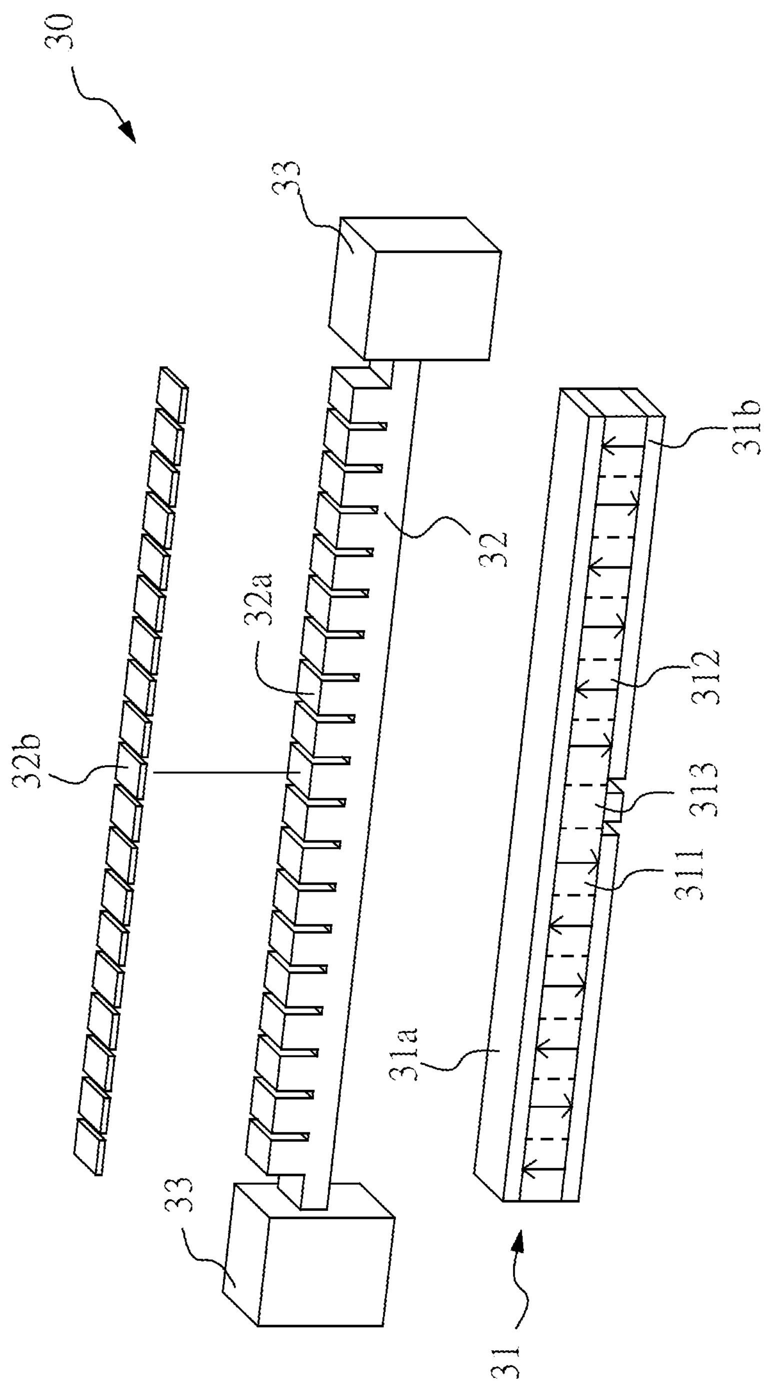
FIG. 1B is an exploded view of the linear piezoelectric motor in the present invention.

Hereafter, please refer to FIG. 1A which is a schematic diagram showing the appearance of a linear piezoelectric motor in the present invention, and FIG. 1B which is an exploded view of the linear piezoelectric motor in the present invention.

Figure 2:
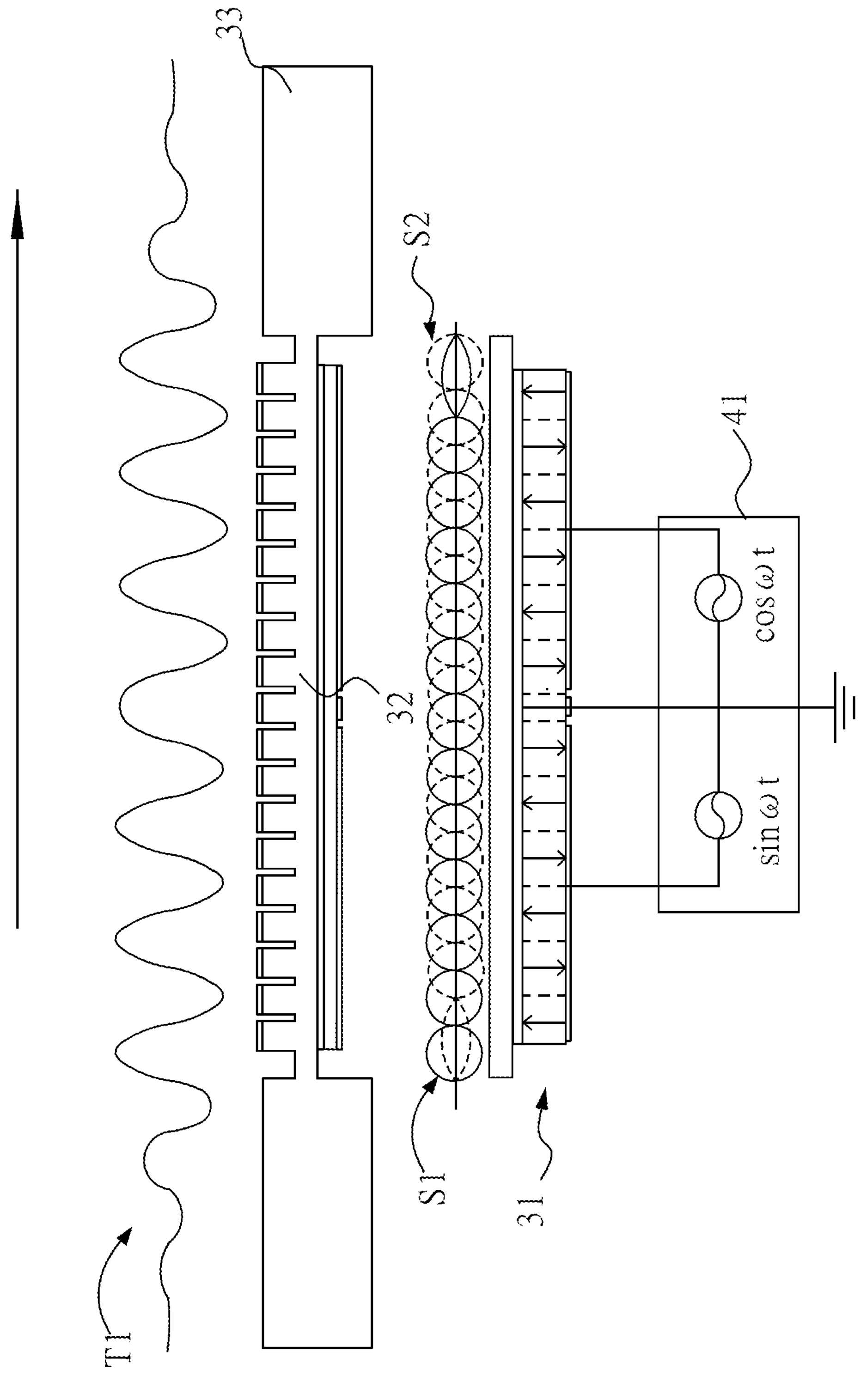
FIG. 2 is a schematic diagram showing a waveform generated by the linear piezoelectric motor according to the present invention.
Figure 3A:
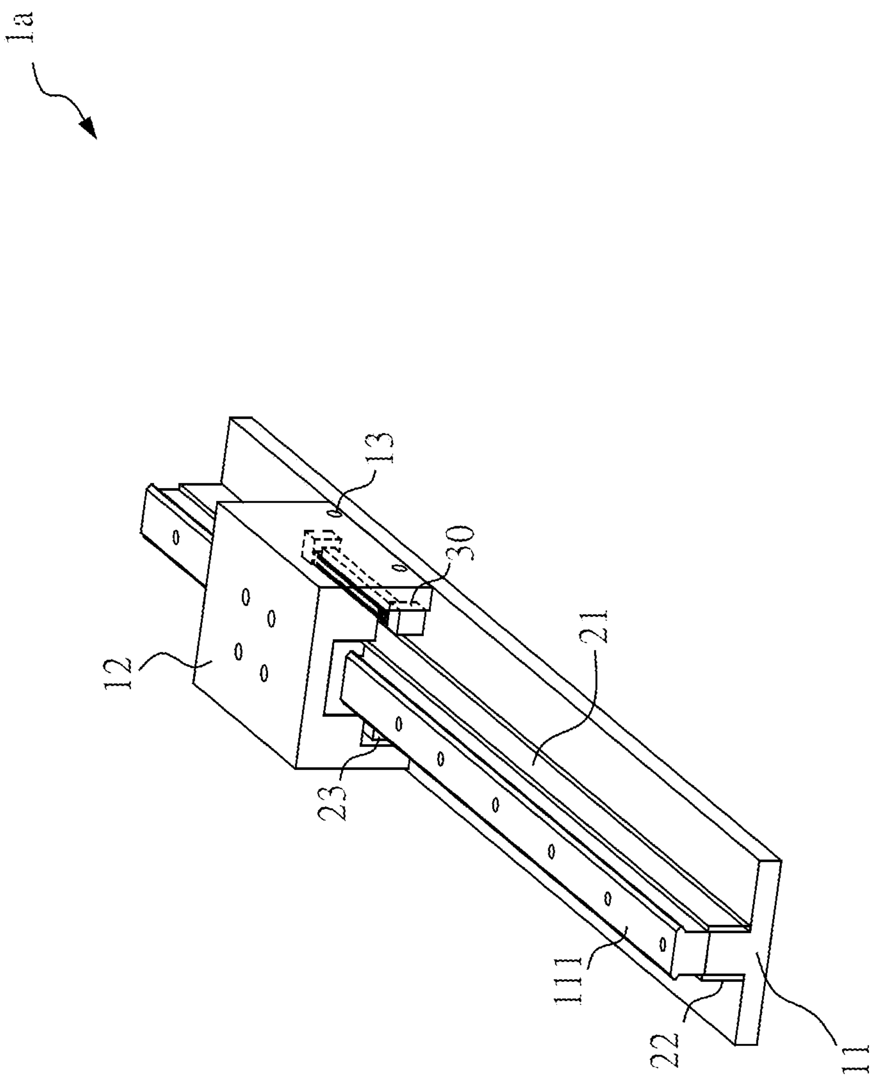
FIG. 3A is a schematic diagram showing the assembly of a slider drive system according to a first embodiment of the present invention.

In an embodiment of the present invention, the linear piezoelectric motor 30 can be used in a slider drive system 1*a* (as shown in FIG. 3A). The linear piezoelectric motor 30 is a short straight beam structure and includes a piezoelectric ceramic element 31 and a base structure 32. The piezoelectric ceramic element 31 includes a first region 311, a second region 312 and an interval region 313 located between the first region 311 and the second region 312, wherein the interval region 313 is a quarter wavelengths. The first region 311 and the second region 312 are connected by a plurality of pairs of adjacent and polarized in the opposite direction single standing wave structures in series transversely, where the number of structures can be increased or decreased according to the functional requirements, but the present invention is not limited thereto. The piezoelectric ceramic element 31 can be divided into taped surface 31*a* and electrode surface 31*b*. The first region 311 and the second region 312 are silver common electrode of the taped surface 31*a*, and drive the electrode surface 31*b* to be a single common electrode. The first region 311 and the second region 312 may be formed by the first power signal and the second power signal supplied by the power supply module 41 (as shown in FIG. 2) to form a first standing wave S1 and a second standing wave S2, respectively. The first standing wave S1 and the second standing wave S2 have a phase difference, so as to form a traveling wave T1 on the base structure 32, i.e. the motor power generation source. It should be noted that the wavelength at which the standing wave is generated is the length of the adjacent single standing wave.

The base structure 32 is made of a metal piece. One side of the base structure 32 is a short straight beam structure used to dispose the piezoelectric ceramic element 31, and the opposite side of the base structure 32 has a plurality of protruding pectinate structures 32*a* to increase the amplitude of the first and the second standing wave, thereby enabling the piezoelectric motor 30 to be driven. The piezoelectric ceramic element 31 may be centered against the center of the base structure 32. Also, the length of the base structure 32 may be greater than one-half wavelength of the piezoelectric ceramic element 31, i.e. the first region 311 and the second region 312 are about the length of the quarter wavelengths from the end surface of the base structure 32, so as to meet the matching length required by the stable structure resonance mode of the first region 311 and the second region 312 with space difference of quarter wavelengths.

Please also refer to FIG. 2, which is a schematic diagram showing a waveform generated by the linear piezoelectric motor according to the present invention.

The power supply module 41 is used to supply the first power signal and the second power signal to the first region 311 and the second region 312 of the piezoelectric ceramic element 31, respectively, such that the first region 311 and the second region 312 generate the first standing wave S1 and the second standing wave S2, respectively. The first power signal and the second power signal are AC signal and have a phase difference. For example, the first power signal phase may be sinωt, and the second power signal phase may be cosωt, but the present invention is not limited thereto. The first region 311 and the second region 312 are driven by the first power signal and the second power signal such that the phase difference between the first standing wave S1 and the second standing wave S2 is 90 degrees or quarter wavelengths. Thus the first standing wave S1 and the second standing wave S2 can form a traveling wave T1 to be transmitted in the base structure 32 to drive the movement of the linear piezoelectric motor 30. Through this design, a weak resonance region is generated at the two end faces of the base structure 3. However, due to the design of using a plurality of single standing waves for the piezoelectric ceramic element 31, the weak resonance region has a very slight effect on the bi-stable standing wave. Since the principle of using resonant drive of double standing wave piezoelectric components is well known to those having the ordinary knowledge in the field in the present invention, it will not be detailed hereafter.

In addition, in view of the stability and durability of the traveling wave friction drive, the friction plate 32*b* is attached to the end face of each pectinate structure 32*a*. The friction plate 32*b* may be made of an alumina ceramic polishing sheet for contact with the ceramic strip 21 (as shown in FIG. 3A) in the same material to provide a good traveling wave friction drive.

It should be noted that, two ends of the base structure 32 in the linear piezoelectric motor 30 are connected with a damping beam 33, respectively. With the larger cross-sectional area of the damping beam 33, the boundary by which the traveling wave T1 transmitted to the base structure 33 can be reduced to suppress the reflection of the traveling wave T1. Its effect is similar to a damping structure to suppress the reflection of the traveling wave T1. Since the damping beam 33 has a cross-sectional area size different than the base structure 32, the cross-sectional area of the base structure 32 is smaller than that of the damping beam 33, like the stepped or exponential shape, which effectively suppresses the reflection of the traveling wave T1.

The structure of the stepped damping beam 33 and the base structure 32 is similar to a conventional horn, and the formula for the magnification coefficient Mp of the horn is as follows:

$$Mp = \frac{S1}{S2}\frac{\sin ka}{\sin kb},$$

where S1 and S2 are the cross-sectional areas of base structure 32 and damping beam 33, respectively; k is the wave number, k=2π/λ; λ is the wavelength; b and a are the lengths of base structure 32 and damping beam 33, respectively.

It can be seen that when the cross-sectional area of the base structure 32 is smaller than that of the damping beam 33, the magnification coefficient Mp is smaller than 1. That is, when the cross-sectional area becomes large, transmitting the traveling wave T1 to an end face effectively reduces and suppresses its reflection.

On the other hand, if the base structure 32 and damping beam 33 are made of different materials, the formula for the magnification factor Mp will change as follows:

$$Mp = \frac{E_1 S_1}{E_2 S_2}\frac{\sin k_1 a}{\sin k_2 b},$$

where E is Young's modulus of the material.

Accordingly, the base structure 32 and the damping beam 33 may be made of the same or different materials. When the material of the base structure 32 and the damping beam 33 is not the same, the effect of suppressing the reflection of the traveling wave T1 may vary. Since the principle of the horn is well known to those having the ordinary knowledge in the field in the present invention, it will not be detailed hereafter.

Figure 3B:
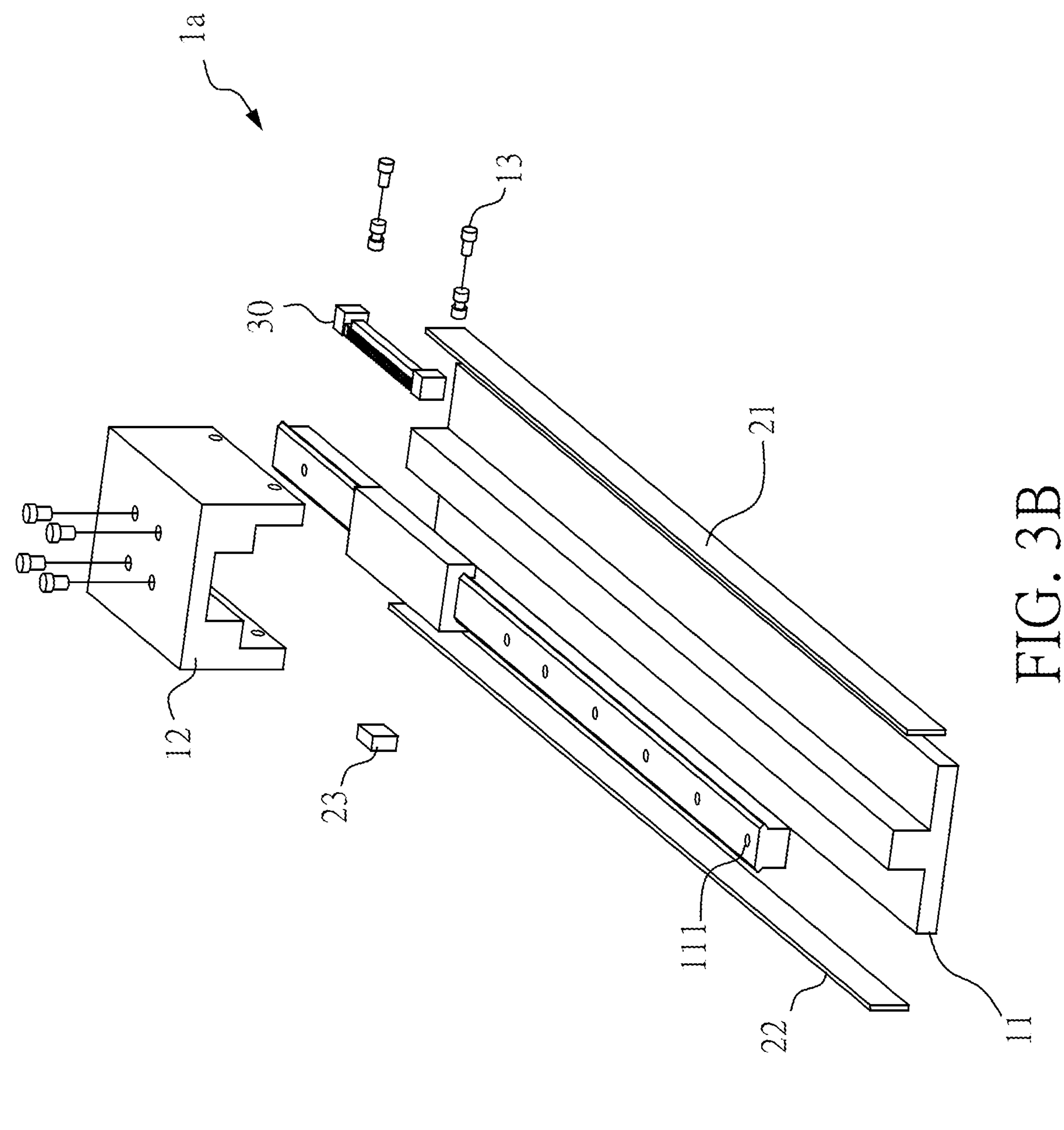
FIG. 3B is an exploded view of the slider drive system according to a second embodiment of the present invention.

Then, please refer to FIG. 3A which is a schematic diagram showing the assembly of a slider drive system according to a first embodiment of the present invention, and FIG. 3B which is an exploded view of the slider drive system according to a second embodiment of the present invention.

The slider drive system 1*a* includes a base 11, a block 12, a ceramic strip 21, a linear piezoelectric motor 30, and a power supply module 41. The base 11 has a track 111 on which the block 12 is located and slidable relative to the track 111. The block 12 may also be a platform-like shape to carry or install other items, but the present invention is not limited thereto. The ceramic strip 21 is attachably disposed on the track 111. The linear piezoelectric motor 30 is fixedly disposed on the block 12 and adjacent to the ceramic strip 21. With pressure adjustment, the surface of the friction plate 32*b* and the ceramic strip 21 can be evenly in close contact with each other. The piezoelectric motor 30 can be fixed with the fixing part 13 by the block 12 in a locking, engaging, or taping manner, but the present invention is not limited thereto. The present invention is not limited to the shape of the fixing part 13 shown in the illustration. In an embodiment of the present invention, the friction contact surface of the linear piezoelectric motor 30 and the block 12, i.e. the friction plate 32*b* and the ceramic strip 21, are made of the same alumina ceramic friction material. Also, each friction surface of the friction plate 32*b* is subject to the mirror polishing with roughness of 0.1 μm to achieve the required friction drive. Since the use of traveling wave friction drive principle is well known to those having the ordinary knowledge in the field, its principle will not be detailed hereafter. Whereby when the linear piezoelectric motor 30 is driven, it can be moved relative to the ceramic strip 21.

In the first embodiment of the present invention, the slider drive system 1*a* can also include an optical ruler 22 and a displacement sensor 23. The optical ruler 22 is provided on the track 111 and is disposed on a different plane on the track 111 with the ceramic strip 21. The displacement sensor 23 is provided on the block 12 and adjacent to the optical ruler 22, and can be fixed to the block 12 by the fixing part 13. In this way, when the block 12 is moved, the displacement sensor 23 performs positioning feedback control. Also, the optical ruler 22 may be used to calculate the displacement distance of the block 12. Since the application of the optical ruler 22 is not the focus of improvement in the present invention, its principle will not be detailed hereafter.

Figure 4A:
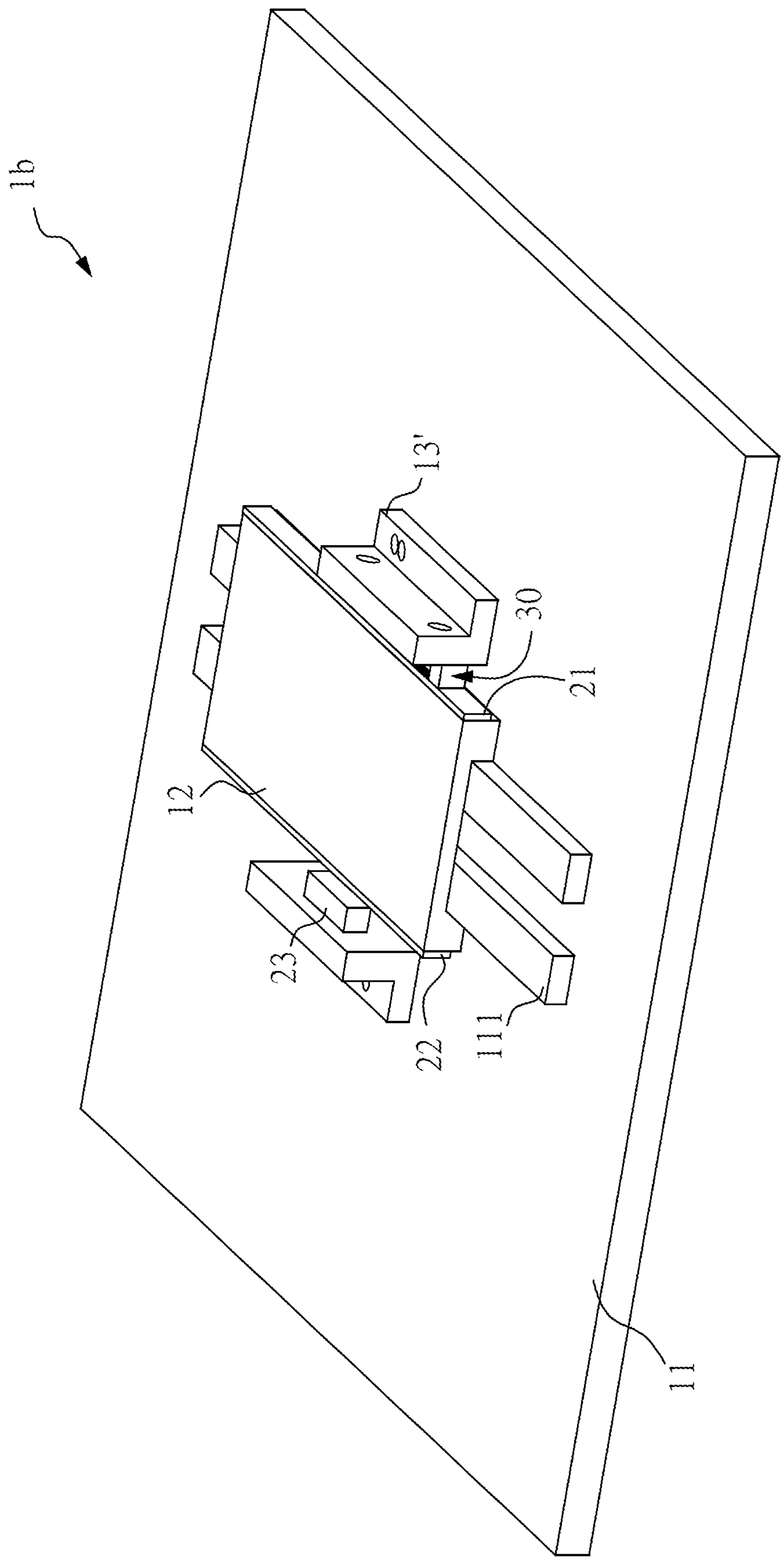
FIG. 4A is a schematic diagram showing the assembly of the slider drive system according to the second embodiment of the present invention.
Figure 4B:
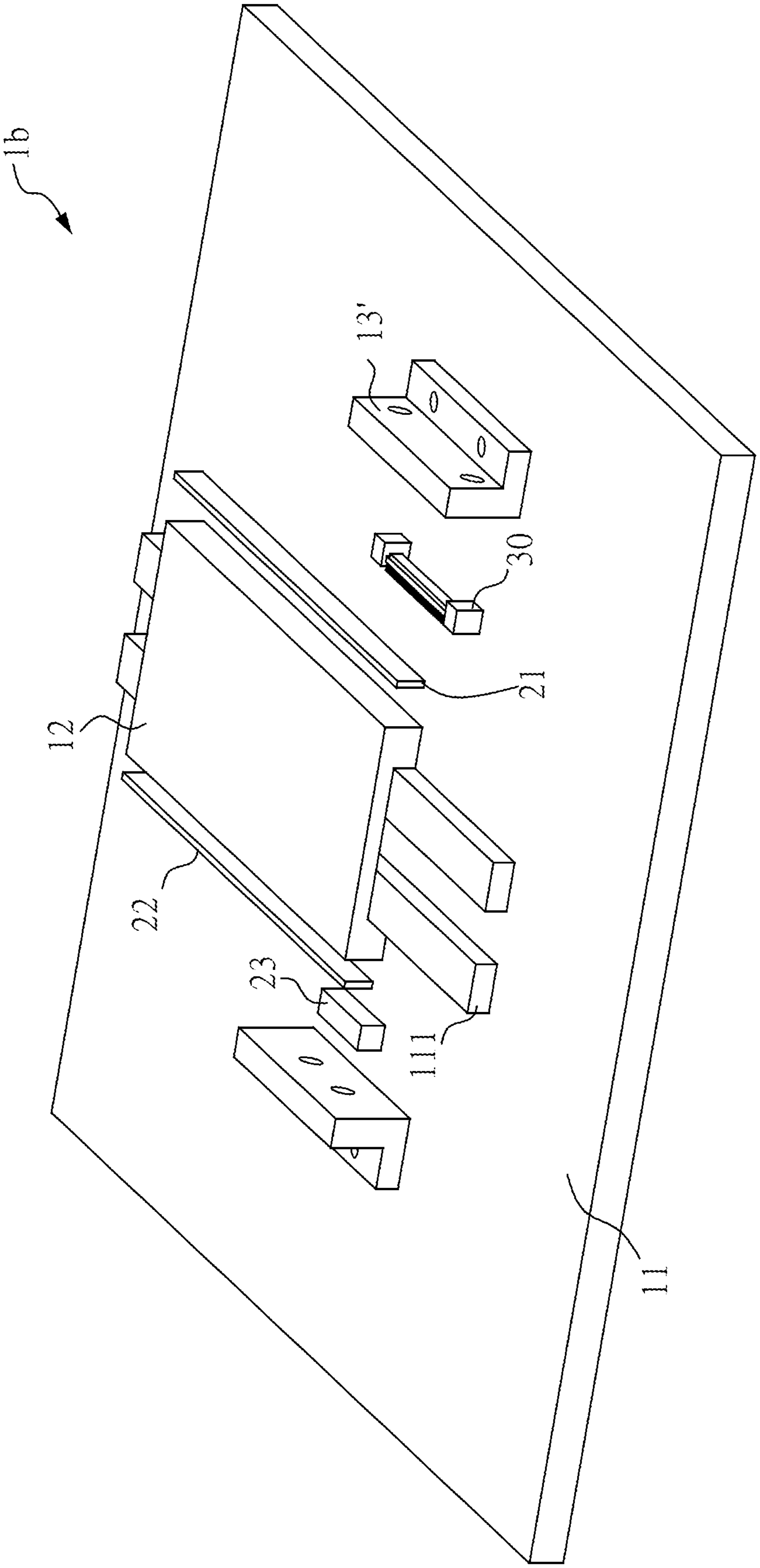
FIG. 4B is another exploded view of the slider drive system according to the second embodiment of the present invention.

Hereafter, please refer to both FIG. 4A which is a schematic diagram showing the assembly of the slider drive system according to the second embodiment of the present invention, and FIG. 4B which is an exploded view of the slider drive system according to the second embodiment of the present invention.

In the second embodiment of the present invention, the ceramic strip 21 and the optical ruler 22 of the slider drive system 1*b* are attached to the block 12. The linear piezoelectric motor 30 is fixed onto the base 11 with the fixing part 13'. The fixing part 13' is disposed in the center of the base 11. With the pressure adjustment, the surface of the friction plate 32*b* and the ceramic strip 21 are evenly in close contact with each other. Accordingly, the traveling wave T1 can be driven by the linear piezoelectric motor 30 to enable the block 12 to move.

With the slider drive system 1*a* or 1*b* described above, the linear piezoelectric motor 30 can drive the block 12 by the generated traveling wave T1, such that the block 12 can be stably moved along the track 111.

It should be noted that the embodiments of the present invention described above are only illustrative. To avoid redundancy, all the possible combinations of changes are not documented in detail. However, it shall be understood by those skilled in the art that each of the modules or elements described above may not be necessary. For the implementation of the present invention, the present invention may also contain other detailed, conventional modules or elements. Each module or component is likely to be omitted or modified depending on the needs. Other modules or elements may not necessarily exist between two of any modules.

What is claimed is:

1. A linear piezoelectric motor, which is used in a slider drive system and driven by a first power signal and a second power signal supplied by a power supply module, respectively, comprising:

a piezoelectric ceramic element, including a first region, a second region, and an interval region located between the first region and the second region, wherein the first region and the second region are formed by the first power signal and the second power signal to form a first standing wave and a second standing wave, respectively, wherein the interval region is a quarter wavelengths, and the first standing wave and the second standing wave have a phase difference, so as to form a traveling wave; and a base structure, disposes the piezoelectric ceramic element and has a pectinate structure for increasing an amplitude of the first standing wave and the second standing wave, so as to enable the piezoelectric motor to be driven.

2. The linear piezoelectric motor as claimed in claim 1, wherein two ends of the base structure are connected with a damping beam respectively, to reduce the traveling wave transmitted to the boundary of the base structure, thus a reflection of the traveling wave is suppressed.

3. The linear piezoelectric motor as claimed in claim 2, wherein the base structure and the damping beam are made of the same material.

4. The linear piezoelectric motor as claimed in claim 2, wherein the base structure and the damping beam are made of different materials.

5. The linear piezoelectric motor as claimed in claim 1, wherein when the piezoelectric ceramic element is disposed on the base structure, the length from two ends of the base structure to the first region and the second region is the length of the quarter wavelengths.

6. The linear piezoelectric motor as claimed in claim 1, wherein the surface of the pectinate structure is further attached with a friction plate.

7. A slider drive system, comprising:

a base, having a track;

a block, disposed on the track and slidable on the track;

a power supply module, used to supply a first power signal and a second power signal, respectively;

a ceramic strip;

a linear piezoelectric motor, in contact with the ceramic strip and electrically connected to the power supply module, comprising:

a piezoelectric ceramic element, including a first region, a second region, and an interval region located between the first region and the second region, wherein the first region and the second region are formed by the first power signal and the second power signal to form a first standing wave and a second standing wave, respectively; wherein the interval region is a quarter wavelengths, and the first and the second standing wave have a phase difference so as to form a traveling wave; and a base structure, disposes the piezoelectric ceramic element and has a pectinate structure to increase an amplitude of the first and the second standing wave, so as to enable the piezoelectric motor to move relative to the ceramic strip.

8. The slider drive system as claimed in claim 7, wherein two ends of the base structure are connected with a damping beam respectively, to reduce the traveling wave transmitted to the boundary of the base structure, thereby suppressing the reflection of the traveling wave.

9. The slider drive system as claimed in claim 8, wherein the base structure and the damping beam are made of the same material.

10. The slider drive system as claimed in claim 8, wherein the base structure and the damping beam are made of different materials.

11. The slider drive system as claimed in claim 7, wherein when the piezoelectric ceramic element is disposed on the base structure, the length from two ends of the base structure to the first region and the second region is the length of the quarter wavelengths.

12. The slider drive system as claimed in claim 7, wherein the linear piezoelectric motor is fixed on the base by a fixing part, and the ceramic strip is disposed on the block.

13. The slider drive system as claimed in claim 12, wherein the fixing part is located in the center of the base.

14. The slider drive system as claimed in claim 12, wherein the surface of the pectinate structure is further attached with a friction plate, such that the friction plate and the ceramic strip are evenly in close contact with each other.

15. The slider drive system as claimed in claim 7, wherein the linear piezoelectric motor is fixed on the block by a fixing part, and the ceramic strip is disposed on the base.

16. The slider drive system as claimed in claim 7, further comprising:

an optical ruler, disposed on the track; and a displacement sensor, disposed on the block and adjacent to the optical ruler to calculate the displacement distance of the block by the optical ruler.

* * * * *